(12) United States Patent
Won (10) Patent No.: US 11,281,525 B1
(45) Date of Patent: Mar. 22, 2022

(54) ELECTRONIC APPARATUS AND METHOD OF CONTROLLING THE SAME

(71) Applicant: SAMSUNG ELECTRONICS CO., LTD., Suwon-si (KR)

(72) Inventor: Kangyoung Won, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/197,270

(22) Filed: Mar. 10, 2021

(30) Foreign Application Priority Data

Sep. 24, 2020 (KR) .................... 10-2020-0123700

(51) Int. Cl.
*G06F 11/00* (2006.01)
*G06F 11/07* (2006.01)
*G06N 20/00* (2019.01)

(52) U.S. Cl.
CPC ........ *G06F 11/0793* (2013.01); *G06F 11/079* (2013.01); *G06F 11/0751* (2013.01); *G06F 11/0778* (2013.01); *G06N 20/00* (2019.01)

(58) Field of Classification Search
CPC ............ G06F 11/0793; G06F 11/0751; G06F 11/0778; G06F 11/079; G06N 20/00
USPC ..................................... 714/1–57
See application file for complete search history.

(56) References Cited

U.S. PATENT DOCUMENTS

| 10,462,418 | B2 | 10/2019 | Won | |
|---|---|---|---|---|
| 2005/0240830 | A1* | 10/2005 | Kubo | G06F 11/006 714/45 |
| 2008/0155324 | A1* | 6/2008 | Gooding | G06F 11/079 714/25 |
| 2008/0250265 | A1 | 10/2008 | Chang et al. | |
| 2013/0031424 | A1* | 1/2013 | Srivastava | G06F 11/079 714/47.2 |
| 2013/0132000 | A1 | 5/2013 | Tamaki | |
| 2013/0246853 | A1* | 9/2013 | Salame | G06F 11/0709 714/37 |

(Continued)

FOREIGN PATENT DOCUMENTS

| KR | 10-2019-0076534 A | 7/2019 |
|---|---|---|
| KR | 10-2019-0103086 A | 9/2019 |
| WO | 2019/088646 A1 | 5/2019 |

OTHER PUBLICATIONS

International Search Report (PCT/ISA/210) and Written Opinion (PCT/ISA/237) dated Jun. 29, 2021 by the International Searching Authority in International Application No. PCT/KR2021/002689.

*Primary Examiner* — Sarai E Butler
(74) *Attorney, Agent, or Firm* — Sughrue Mion, PLLC (57) ABSTRACT

Disclosed is an electronic apparatus including a processor, and a memory configured to store instructions executable by the processor in which the processor is configured to: obtain state data about operations of a plurality of components in the electronic apparatus, identify a state error of a first component among the plurality of components based on the obtained state data, obtain error data about a correlation between the identified state error of the first component and a second component causing the state error among the plurality of components, identify possibility of occurrence of the state error of the first component based on the obtained state data and the obtained error data, and perform an error-related operation for the second component correlating with the state error of the first component.

17 Claims, 7 Drawing Sheets

(56) References Cited

U.S. PATENT DOCUMENTS

| | | | |
|---|---|---|---|
| 2014/0047271 A1* | 2/2014 | Gray | G06F 11/008 714/25 |
| 2015/0163103 A1* | 6/2015 | Bodine | G06F 11/0709 714/57 |
| 2015/0178142 A1* | 6/2015 | Raj | G06F 11/0787 714/49 |
| 2015/0269020 A1* | 9/2015 | Nakashima | G06F 11/1064 714/6.22 |
| 2015/0331775 A1* | 11/2015 | Slik | G06F 11/1451 714/6.23 |
| 2016/0077917 A1* | 3/2016 | Battepati | G06F 11/1451 714/15 |
| 2016/0246661 A1 | 8/2016 | Hofig | |
| 2017/0063886 A1* | 3/2017 | Muddu | G06K 9/2063 |
| 2018/0091770 A1 | 3/2018 | Won | |
| 2018/0351840 A1 | 12/2018 | Kondo et al. | |
| 2019/0354080 A1 | 11/2019 | Yoshida et al. | |

* cited by examiner

| | DISPLAY | HDMI PORT | | |
|---|---|---|---|---|
| | | Hot Plug Voltage | EQ | Hot Plug duration time |
| 1 | No Signal | 1V | 7 | 900ms |
| 2 | No Signal | 5V | 8 | 400ms |
| 3 | Signal | 5V | -12 | 1000ms |

ELECTRONIC APPARATUS AND METHOD OF CONTROLLING THE SAME

CROSS-REFERENCE TO RELATED THE APPLICATION

This application is based on and claims priority under 35 U.S.C. § 119 to Korean Patent Application No. 10-2020-0123700 filed on Sep. 24, 2020 in the Korean Intellectual Property Office, the disclosure of which is incorporated by reference herein in its entirety.

BACKGROUND

Field

The disclosure relates to an electronic apparatus which solves occurrence of an error, and a method of controlling the same.

Description of the Related Art

With diversification of the kinds and functions of an electronic apparatus, a method of detecting an error that occurs in the electronic apparatus or solving the error has attracted attention.

In a case where the electronic apparatus does not autonomously detect an error or does not previously grasp or improve a condition that an error is likely to occur, it is possible to solve an error only after the error actually occurs.

Although an error actually occurs in the electronic apparatus, in a case where a system stores only information about an error that frequently occurs in the electronic apparatus or about a previously defined error, it is possible to give the information or provide a guide for solving the error to a user only when the stored information matches the actually occurred error. In this case, the previously defined guide for a user is not much different in a handling condition from that for a service engineer. Therefore, when an error is handled by the service engineer, handling services are varied depending on the experiences and capabilities of the service engineer aside from the given service guide.

Further, a previously defined diagnosis or solution may cause a secondary problem based on a wrong diagnosis and service, or provide a service or the like again, thereby lowering reliability. Thus, such an unnecessary service results in an intangible loss due to a damaged image of a product and a manufacturer, and a tangible quality cost recurs due to a reservice and a plurality of serviced parts due to a wrong diagnosis.

SUMMARY

An aspect of the disclosure is to provide an electronic apparatus, which can more efficiently predict and prevent an error, and a method of controlling the same.

According to an embodiment of the disclosure, there is provided an electronic apparatus including a processor, and a memory configured to store instructions executable by the processor in which the processor is configured to: obtain state data about operations of a plurality of components in the electronic apparatus, identify a state error of a first component among the plurality of components based on the obtained state data, obtain error data about a correlation between the identified state error of the first component and a second component causing the state error among the plurality of components, identify possibility of occurrence of the state error of the first component based on the obtained state data and the obtained error data, and perform an error-related operation for the second component correlating with the state error of the first component.

The error data may include a model learned to perform calculation for the correlation between the identified state error of the first component and the second component causing the state error.

The processor may be configured to display a graphic user interface (GUI), which shows the state error of the first component and parameters about the second component corresponding to the state error, on a display.

The processor may be configured to perform the error-related operation for the second component based on a user's input received through the GUI.

The processor may be configured to perform the error-related operation by changing setting for parameters about the second component to lower the possibility of occurrence of the state error.

The processor may be configured to: display a GUI, which shows the state error of the first component and parameters about the second component corresponding to the state error, on a display, based on the possibility of occurrence of the state error not lowered by changing the setting for the parameters; and perform the error-related operation for the second component based on a user's input received through the GUI.

The processor may be configured to periodically identify the possibility of occurrence of the state error of the first component.

The processor may be configured to identify the state error of the first component based on state data of an operation of the first component and state data of an operation of the second component.

The electronic apparatus may further include a display and a high-definition multimedia interface (HDMI) port, and the first component may be the display and the second component may be the HDMI port.

According to an embodiment of the disclosure, there is provided a method of controlling an electronic apparatus, including: obtaining state data about operations of a plurality of components in the electronic apparatus, identifying a state error of a first component among the plurality of components based on the obtained state data, obtaining error data about a correlation between the identified state error of the first component and a second component causing the state error among the plurality of components, identifying possibility of occurrence of the state error of the first component based on the obtained state data and the obtained error data, and performing an error-related operation for the second component correlating with the state error of the first component.

The error data may include a model learned to perform calculation for the correlation between the identified state error of the first component and the second component causing the state error.

The method may further include displaying a graphic user interface (GUI), which shows the state error of the first component and parameters about the second component corresponding to the state error, on a display.

The method may further include performing an error-related operation for the second component based on a user's input received through the GUI.

The performing of the error-related operation may include performing the error-related operation by changing setting for parameters about the second component to lower the possibility of occurrence of the state error.

The performing of the error-related operation may include displaying a GUI, which shows the state error of the first component and parameters about the second component corresponding to the state error, on a display, based on the possibility of occurrence of the state error not lowered by changing the setting for the parameters, and performing the error-related operation for the second component based on a user's input received through the GUI.

The identifying of the possibility of occurrence of the state error of the first component may include periodically identify the possibility of occurrence of the state error of the first component.

The identifying of the state error of the first component may include identifying the state error based on state data of an operation of the first component and state data of an operation of the second component affecting the state error of the first component.

The first component may be a display of the electronic apparatus and the second component may be a high-definition multimedia interface (HDMI) port of the electronic apparatus.

According to an embodiment of the disclosure, there is provided a recording medium stored with a computer program including a code, which performs a method of controlling an electronic apparatus, as a computer-readable code, the method including: obtaining state data about operations of a plurality of components in the electronic apparatus; identifying a state error of a first component among the plurality of components based on the obtained state data, obtaining error data about a correlation between the identified state error of the first component and a second component causing the state error among the plurality of components, identifying possibility of occurrence of the state error of the first component based on the obtained state data and the obtained error data, and performing an error-related operation for the second component correlating with the state error of the first component.

BRIEF DESCRIPTION OF THE DRAWINGS

The above and/or the aspects will become apparent and more readily appreciated from the following description of exemplary embodiments, taken in conjunction with the accompanying drawings, in which.

DETAILED DESCRIPTION

Below, embodiments of the disclosure will be described in detail with reference to the accompanying drawings. In the drawings, like numerals or symbols refer to like elements having substantially the same function, and the size of each element may be exaggerated for clarity and convenience of description. However, the technical concept of the disclosure and its key components and functions are not limited to those described in the following embodiments. In the following descriptions, details about publicly known technologies or components may be omitted if they unnecessarily obscure the gist of the disclosure.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

Figure 1:
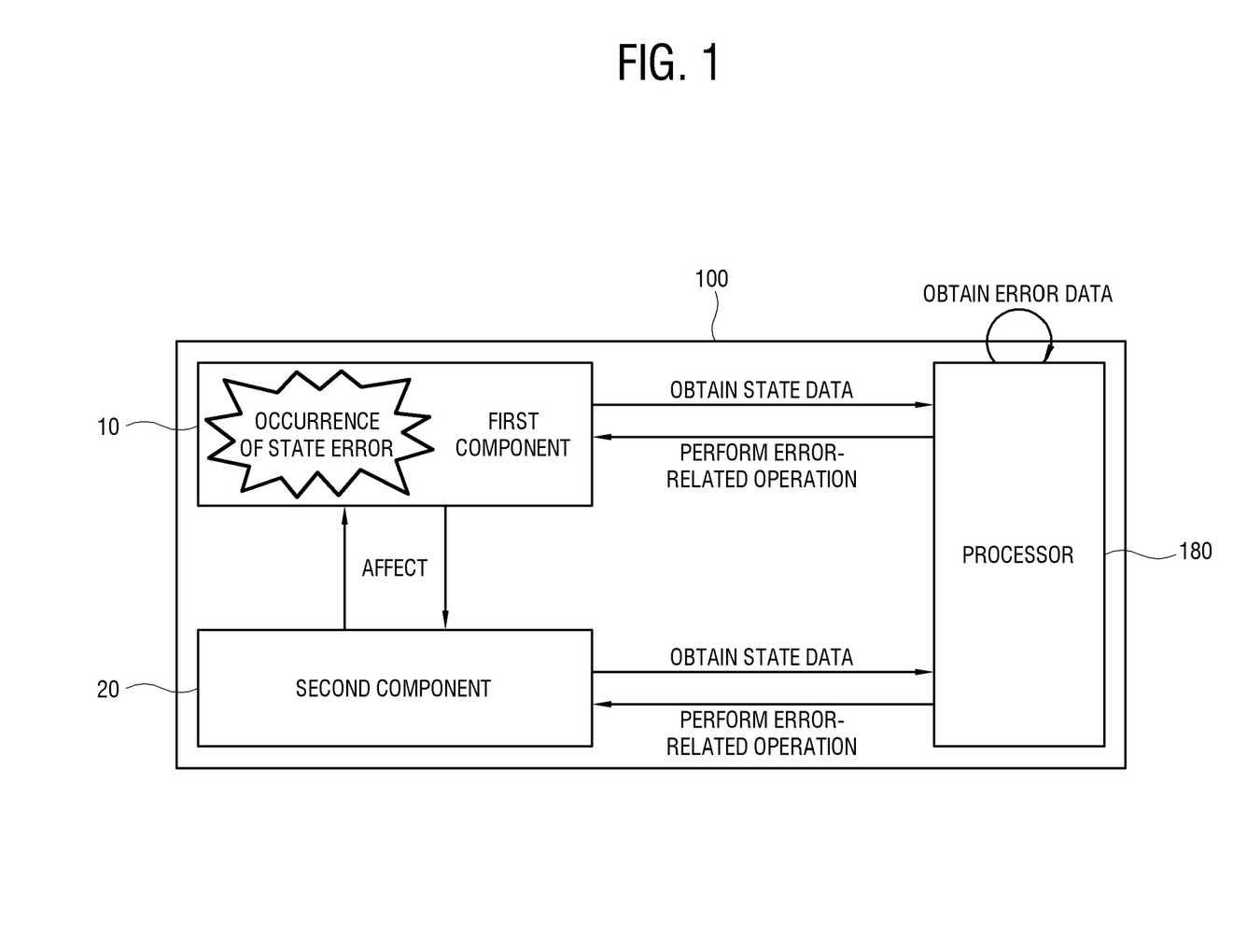
FIG. 1 illustrates an operation of an electronic apparatus according to an embodiment of the disclosure.

FIG. 1 illustrates an operation of an electronic apparatus according to an embodiment of the disclosure.

In this drawing, an electronic apparatus 100 is illustrated to include a first component 10, a second component 20, and a processor 180.

The electronic apparatus 100 according to an embodiment of the disclosure may be embodied by a television (TV) but not limited to the TV, and may be embodied by a smartphone, a tablet personal computer (PC), a laptop computer, a head mounted display (HMD), a near eye display (NED), a large format display (LFD), a digital signage, a digital information display (DID), a video wall, a projector display, a quantum dot (QD) display panel, quantum dot light-emitting diodes (QLED), micro light-emitting diodes (μLED), a mini LED, and the like various displays, a camera, a camcorder, a printer, a server, etc.

Alternatively, the electronic apparatus 100 may be embodied by a touch screen with a touch sensor, a flexible display, a rollable display, a three dimensional (3D) display, a display where a plurality of display modules are physically connected, etc. Alternatively, the electronic apparatus 100 may include no display like a set-top box (STB) or a simple display for indication or the like, and output an image to an external apparatus with a separate display through a wired/wireless interface. Besides, the electronic apparatus 100 may be a system itself with a clouding computer environment, and may include any apparatus without limitations as long as it can process data through an artificial intelligence (AI) model.

The electronic apparatus 100 includes a plurality of components such as the first component 10, and the second component 20 regardless of hardware or software. For example, the component may include a high-definition multimedia interface (HDMI) port of an interface unit to be described later with reference to FIG. 2, a display of a display unit, a user input unit, or the like hardware component, or may include a boot sequence or the like software component.

An error may occur while the plurality of components in the electronic apparatus 100 are operating, and this error will be called a state error. The state error may be identified based on state data obtained with regard to the operations of the plurality of components of the electronic apparatus 100. The state data refers to all pieces of data collectable with regard to the operations of the plurality of components.

According to an embodiment of the disclosure, the first component 10 refers to a component in which the state error occurs or is expected to occur while the electronic apparatus 100 is operating, and the second component 20 refers to a component which causes the state error. In more detail, the second component 20 refers to at least one component that complexly affects the state error of the first component 10.

According to the disclosure, the electronic apparatus 100, in particular, the processor 180 autonomously diagnoses the operations of the plurality of components, performs resetting for the optimum state of the first component 10 in which the state error is detected or the second component 20 which causes the state error or provides a right guide to a user, thereby making the electronic apparatus 100 continue to operate stably.

In this case, the electronic apparatus 100 may use AI technology to perform calculation of a correlation between the identified state error of the first component 10 and the second component 20 causing the state error.

To implement the AI technology, the processor 180 may be embodied by not only a central processing unit (CPU), an application processor (AP), a digital signal processor (DSP) or the like universal processor, but also combination of software and a graphic processing unit (GPU), a vision processing unit (VPU) or the like graphic-only processor or a neural processing unit (NPU) or the like AI-only processor.

The AI technology may be achieved by machine learning (deep learning) and technologies using the machine learning. More detailed descriptions will be made later.

According to an embodiment of the disclosure, the possibility of occurrence of the state error is identified based on an AI model learned based on the state data about the operations of the plurality of components, thereby obtaining more reliable results.

Figure 2:
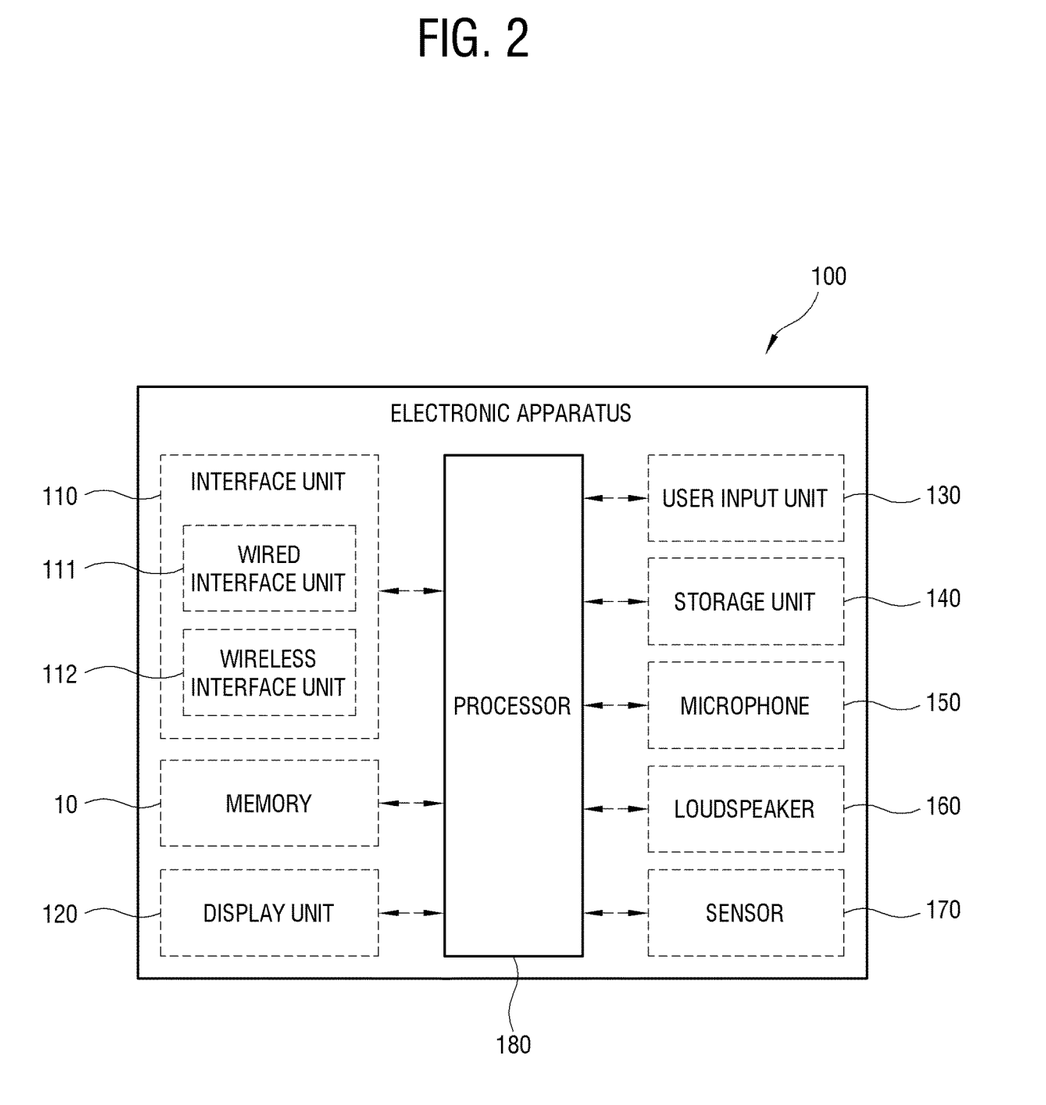
FIG. 2 is a block diagram of an electronic apparatus according to an embodiment of the disclosure.

FIG. 2 is a block diagram of an electronic apparatus according to an embodiment of the disclosure.

As shown in FIG. 2, the electronic apparatus 100 may include an interface unit.

The interface unit 110 may include a wired interface unit 111. The wired interface unit 111 includes a connector or port to which an antenna for receiving a broadcast signal based on a terrestrial/satellite broadcast or the like broadcast standards is connectable, or a cable for receiving a broadcast signal based on cable broadcast standards is connectable. Alternatively, the electronic apparatus 100 may include a built-in antenna for receiving a broadcast signal. The wired interface unit 111 may include a connector, a port, etc. based on video and/or audio transmission standards, like an HDMI port, DisplayPort, a DVI port, a thunderbolt, composite video, component video, super video, syndicat des constructeurs des appareils radiorécepteurs et téléviseurs (SCART), etc. The wired interface unit 111 may include a connector, a port, etc. based on universal data transmission standards like a universal serial bus (USB) port, etc. The wired interface unit 111 may include a connector, a port, etc. to which an optical cable based on optical transmission standards is connectable. The wired interface unit 111 may include a connector, a port, etc. to which an external microphone or an external audio device including a microphone is connected, and which receives or inputs an audio signal from the audio device. The wired interface unit 111 may include a connector, a port, etc. to which a headset, an ear phone, an external loudspeaker or the like audio device is connected, and which transmits or outputs an audio signal to the audio device. The wired interface unit 111 may include a connector or a port based on Ethernet or the like network transmission standards. For example, the wired interface unit 111 may be embodied by a local area network (LAN) card or the like connected to a router or a gateway by a wire.

The wired interface unit 111 is connected to a set-top box, an optical media player or the like external apparatus or an external display apparatus, a loudspeaker, a server, etc. by a cable in a manner of one to one or one to N (where, N is a natural number) through the connector or the port, thereby receiving a video/audio signal from the corresponding external apparatus or transmitting a video/audio signal to the corresponding external apparatus. The wired interface unit 111 may include connectors or ports to individually transmit video/audio signals.

Further, according to an embodiment of the disclosure, the wired interface unit 111 may be embodied as built in the electronic apparatus 100, or may be embodied in the form of a dongle or a module and detachably connected to the connector of the electronic apparatus 100.

The interface unit 110 may include a wireless interface unit 112. The wireless interface unit 112 may be embodied variously corresponding to the types of the electronic apparatus 100. For example, the wireless interface unit 112 may use wireless communication based on radio frequency (RF), Zigbee, Bluetooth, Wi-Fi, ultra wideband (UWB), near field communication (NFC) etc. The wireless interface unit 112 may be embodied by a wireless communication module that performs wireless communication with an access point (AP) based on Wi-Fi, a wireless communication module that performs one-to-one direct wireless communication such as Bluetooth, etc. The wireless interface unit 112 may wirelessly communicate with a server on a network to thereby transmit and receive a data packet to and from the server. The wireless interface unit 112 may include an infrared (IR) transmitter and/or an IR receiver to transmit and/or receive an IR signal based on IR communication standards. The wireless interface unit 112 may receive or input a remote control signal from a remote controller or other external devices, or transmit or output the remote control signal to other external devices through the IR transmitter and/or IR receiver. Alternatively, the electronic apparatus 100 may transmit and receive the remote control signal to and from the remote controller or other external devices through the wireless interface unit 112 based on Wi-Fi, Bluetooth or the like other standards.

The electronic apparatus 100 may further include a tuner to be tuned to a channel of a received broadcast signal, when a video/audio signal received through the interface unit 110 is a broadcast signal.

When the electronic apparatus 100 is embodied by a display apparatus, the electronic apparatus 100 may include a display unit 120. The display unit 120 includes a display for displaying an image on a screen. The display has a light-receiving structure like a liquid crystal type or a light-emitting structure like an OLED type. The display unit 120 may include an additional component according to the types of the display. For example, when the display is of the liquid crystal type, the display unit 120 includes a liquid crystal display (LCD) panel, a backlight unit for emitting light, a panel driving substrate for driving the liquid crystal of the LCD panel.

The electronic apparatus 100 may include a user input unit 130. The user input unit 130 includes various kinds of input interface circuits for receiving a user's input. The user input unit 130 may be variously embodied according to the kinds of the electronic apparatus 100, and may, for example, include mechanical or electronic buttons of the electronic apparatus 100, a remote controller separated from the electronic apparatus 100, an input unit of an external device connected to the electronic apparatus 100, a touch pad, a touch screen installed in the display unit 120, etc.

The electronic apparatus 100 may include a storage unit 140. The storing unit 140 is configured to store digitalized data. The storing unit 140 includes a nonvolatile storage which retains data regardless of whether power is on or off, and a volatile memory to which data to be processed by the processor 180 is loaded and which retains data only when power is on. The storage includes a flash-memory, a harddisc drive (HDD), a solid-state drive (SSD) a read only memory (ROM), etc. and the memory includes a buffer, a random access memory (RAM), etc.

The storing unit 140 may be configured to store information about an AI model including a plurality of layers. Here, to store the information about the AI model is to store various pieces of information related to operations of the AI model, for example, information about the plurality of layers included in the AI model, information about parameters (e.g. a filter coefficient, a bias, etc.) used in the plurality of layers, etc. For example, the storing unit 140 may be configured to store information about an AI model learned to obtain upscaling information of an input image (or information related to voice recognition, information about objects in an image, etc.) according to an embodiment of the disclosure. However, when the processor is embodied by hardware dedicated for the AI model, the information about the AI model may be stored in a built-in memory of the processor.

The electronic apparatus 100 may include a microphone 150. The microphone 150 collects a sound of an external environment such as a user's voice. The microphone 150 transmits a signal of the collected sound to the processor 180. The electronic apparatus 100 may include the microphone 150 to collect a user's voice, or receive a voice signal from an external apparatus such as a smartphone, a remote controller with a microphone, etc. through the interface unit 110. The external apparatus may be installed with a remote control application to control the electronic apparatus 100 or perform a function of voice recognition, etc. The external apparatus with such an installed application can receive a user's voice, and perform data transmission/reception and control through Wi-Fi/BT or infrared communication with the electronic apparatus 100, and thus a plurality of interface units 110 for the communication may be present in the electronic apparatus 100.

The electronic apparatus 100 may include a loudspeaker 160. The loudspeaker 160 outputs a sound based on audio data processed by the processor 180. The loudspeaker 160 includes a unit loudspeaker corresponding to audio data of a certain audio channel, and may include a plurality of unit loudspeakers respectively corresponding to audio data of a plurality of audio channels. Alternatively, the loudspeaker 160 may be provided separately from the electronic apparatus 100, and in this case the electronic apparatus 100 may transmit audio data to the loudspeaker 160 through the interface unit 110.

The electronic apparatus 100 may include a sensor 170. The sensor 170 may detect the state of the electronic apparatus 100 or the surrounding states of the electronic apparatus 100, and transmit information of the detected state to the processor 180. The sensor 170 may include, but not limited to, at least one of a magnetic sensor, an acceleration sensor, a temperature/moisture sensor, an infrared sensor, a gyroscope sensor a positioning sensor (e.g. a global positioning system (GPS)), a barometer, a proximity sensor, and a red/green/blue (RGB) sensor (e.g. an illuminance sensor). It will be possible for those skilled in the art to intuitively infer the functions of the sensors from their names, and thus detailed descriptions thereof will be omitted. The processor 180 may store a detected value defined by a tap between the electronic apparatus 100 and an external apparatus in the storing unit 140. In the future, when a user event is detected, the processor 180 may identify whether the user event occurs or not based on whether the detected value matches the stored value.

The electronic apparatus 100 may include the processor 180. The processor 180 may include one or more hardware processors embodied by a CPU, a chipset, a buffer, a circuit, etc. mounted onto a printed circuit board, and may also be designed as a system on chip (SOC). The processor 180 may include modules corresponding to various processes, such as a demultiplexer, a decoder, a scaler, an audio digital signal processor (DSP), an amplifier, etc. when the electronic apparatus 100 is embodied by a display apparatus. Here, some or all of the modules may be embodied as the SOC. For example, the demultiplexer, the decoder, the scaler, and the like modules related to video processing may be embodied as a video processing SOC, and the audio DSP may be embodied as a chipset separated from the SOC.

The processor 180 may perform control to process input data, based on the AI model or operation rules previously defined in the storing unit 140. Further, when the processor 180 is an exclusive processor (or a processor dedicated for the AI), the processor 180 may be designed to have a hardware structure specialized for processing a specific AI model. For example, the hardware specialized for processing the specific AI model may be designed as an application specific integrated circuit (ASIC), a field-programmable gate array (FPGA), or the like hardware chip.

The output data may be varied depending on the kinds of AI models. For example, the output data may include, but not limited to, an image improved in resolution, information about an object contained in the image, a text corresponding to a voice, etc.

When a voice signal of a user's voice is obtained through the microphone 150 or the like, the processor 180 may convert the voice signal into voice data. In this case, the voice data may be text data obtained through a speech-totext (STT) process of converting a speech signal into the text data. The processor 180 identifies a command indicated by the voice data, and performs an operation based on the identified command. Both the process of the voice data and the process of identifying and carrying out the command may be performed in the electronic apparatus 100. However, in this case, system load needed for the electronic apparatus 100 and required storage capacity are relatively increased, and therefore at least a part of the process may be performed by at least one server connected for communication with the electronic apparatus 100 through a network.

The processor 180 according to the disclosure may call and execute at least one instruction among instructions for software stored in a storage medium readable by the electronic apparatus 100 or the like machine. This enables the electronic apparatus 100 and the like machine to perform at least one function based on the at least one called instruction. The one or more instructions may include a code created by a compiler or a code executable by an interpreter. The machine-readable storage medium may be provided in the form of a non-transitory storage medium. Here, the 'non-transitory' merely means that the storage medium is tangible and does not include a signal (for example, an electromagnetic wave), and this term does not distinguish between cases where data is semi-permanently and temporarily stored in the storage medium.

Meanwhile, the processor 180 obtains state data about operations of a plurality of components in the electronic apparatus, identifies a state error of a first component among the plurality of components based on the obtained state data, obtains error data about a correlation between the identified state error of the first component and the second component causing the state error, identifies possibility that the state error of the first component will occur based on the obtained state data and error data, and performs at least a part of data analysis, process, and result information generation for performing error-related operations for the second component correlating with the state error of the first component, the possibility of which is identified, through at least one of machine learning, a neural network, or a deep learning algorithm as a rule-based or AI algorithm.

An AI system refers to a computer system that has an intelligence level of a human, in which a machine learns and determines by itself and recognition rates are improved the more it is used.

The AI technology is based on elementary technology by utilizing machine learning (deep learning) technology and machine learning algorithms using an algorithm of autonomously classifying/learning features of input data to copy perception, determination and the like functions of a human brain.

The elementary technology may for example include at least one of linguistic comprehension technology for recognizing a language/text of a human, visual understanding technology for recognizing an object like a human sense of vision, inference/prediction technology for identifying information and logically making inference and prediction, knowledge representation technology for processing experience information of a human into knowledge data, and motion control technology for controlling a vehicle's automatic driving or a robot's motion.

The linguistic comprehension refers to technology of recognizing and applying/processing a human's language/character, and includes natural language processing, machine translation, conversation system, question and answer, voice recognition/synthesis, etc. The visual understanding refers to technology of recognizing and processing an object like a human sense of vision, and includes object recognition, object tracking, image search, people recognition, scene understanding, place understanding, image enhancement, etc. The inference/prediction refers to technology of identifying information and logically making prediction, and includes knowledge/possibility-based inference, optimized prediction, preference-based plan, recommendation, etc. The knowledge representation refers to technology of automating a human's experience information into knowledge data, and includes knowledge building (data creation/classification), knowledge management (data utilization), etc.

The processor 180 may function as a learner and a recognizer. The learner may perform a function of generating the learned neural network, and the recognizer may perform a function of recognizing (or inferring, predicting, estimating and identifying) the data based on the learned neural network.

The learner may generate or update the neural network. The learner may obtain learning data to generate the neural network. For example, the learner may obtain the learning data from the storage unit 140 or from the outside. The learning data may be data used for learning the neural network, and the data subjected to the foregoing operations may be used as the learning data to teach the neural network.

Before teaching the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network which is set to perform the operations.

The learned neural network may include a plurality of neural networks (or layers). The nodes of the plurality of neural networks have weight values, and performs neural network calculation through calculation between the calculation result of the previous layer and the plurality of weight values. The plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to carry out the foregoing operations. The target data may be obtained from the storage unit 140 or from the outside. The target data may be data targeted to be recognized by the neural network. Before applying the target data to the learned neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

The data for teaching and training the AI model may be created through an external server. However, it will be appreciated that, as necessary, the learning of the AI model is achieved in the electronic apparatus, and the learning data is also created in the electronic apparatus.

For example, the method of controlling the electronic apparatus 100 according to the disclosure may be provided as involved in a computer program product. The computer program product may include instructions of software to be executed by the processor 180 as described above. The computer program product may be traded as a commodity between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least a part of the computer program product may be transitorily stored or temporarily produced in a machine-readable storage medium such as a memory of a manufacturer server, an application-store server, or a relay server.

Figure 3:
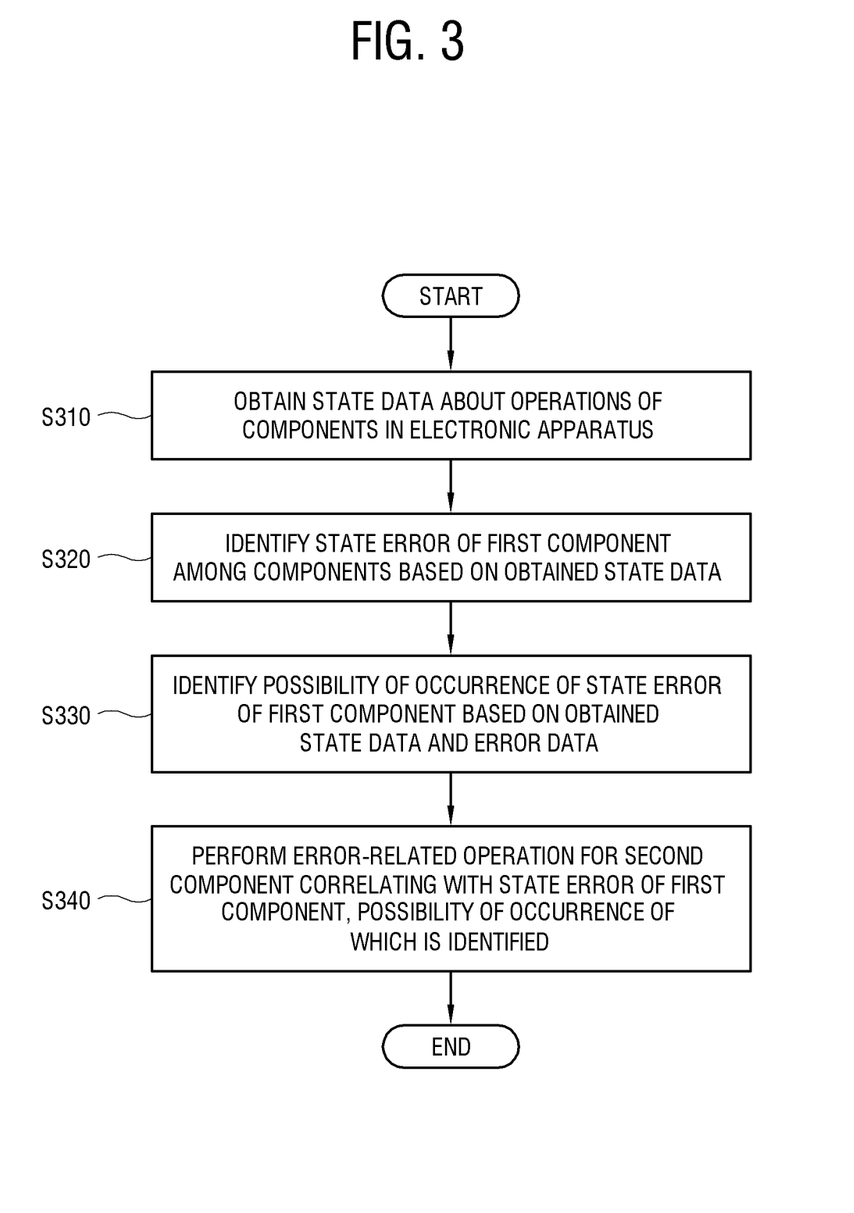
FIG. 3 is an operation flowchart of an electronic apparatus according to an embodiment of the disclosure.

FIG. 3 is an operation flowchart of an electronic apparatus according to an embodiment of the disclosure.

According to an embodiment of the disclosure, the processor 180 obtains state data about operations of a plurality of components in the electronic apparatus 100 (S310).

As described above, the state data refers to any pieces of data collectable in relation to the operations of the plurality of components.

Thus, the state data includes not only operation data of the plurality of components in the electronic apparatus 100, but also data related to time-series progress of each piece of the operation data, surrounding environments of the electronic apparatus 100, and peripheral external apparatuses.

The state data may, for example, include a hot-plug duration time of the HDMI port, the usage of the processor, the minimum or maximum value of various phase locked loops (PLL) such as the processor, a timing margin value for a stable operation of a double data rate (DDR) memory, an equalizer (EQ) margin value of a connected cable, the kinds and number of connected external devices, an operation mode or resolution of the display, the temperature of the plurality of components including a main circuit, an ambient temperature of the electronic apparatus, etc.

The processor 180 collects the state data of the operation in real time, and obtains the state data periodically or in units of components. The processor 180 may store the obtained state data in the storage unit 140.

According to an embodiment of the disclosure, the processor 180 identifies the state error of the first component among the plurality of components based on the obtained state data (S320).

The state error refers to an error identified based on the state data obtained with regard to the operations of the plurality of components in the electronic apparatus 100.

For example, the processor 180 may identify an output error of the display based on that a feedback voltage detected through a hot plug detect (HPD) line is lower than a previously defined voltage, or identify an error that a power circuit abnormally operates based on that the temperature of the power circuit kept at 30~40° C. is suddenly increased to be higher than or equal to 60° C. or the detected level of the voltage or current collected in the power circuit is out of a management range, as the state error.

As shown in the foregoing example, the state error may be identified based on the state data of the first component where an error occurs. However, the state error may be identified based on not only the state data of the first component, but also the state data of other components that affect the state error of the first component.

According to an embodiment of the disclosure, the processor 180 obtains the identified state error of the first component and the error data about the correlation with the second component causing the state error (S330).

According to an embodiment of the disclosure, the error data may be based on a relationship between the second component and the identified state error of the first component from the state data of the plurality of components in the electronic apparatus 100. The operation of the second component may affect the state error of the first component, and the processor 180 may identify how the change in the operation of the second component affects the state error of the first component based on the state data obtained under many situations, i.e. identify the correlation between the change and the state error of the first component.

The error data includes a model learned to perform calculation about the correlation between the identified state error of the first component 10 and the second component 20 causing the state error.

The processor 180 obtains the state data at a specific point in time or periodically under a specific situation, and generates a model by learning the time-series progress of the state data, the change in the state data before and after the state error occurs, or the like. This is based on the operations of the processor described with referenced to FIG. 2, and its details will be described later with reference to FIG. 4.

According to an embodiment of the disclosure, the processor 180 identifies the possibility of occurrence of the state error of the first component based on the obtained state data and error data (S340).

The state data obtained in this process refers to the state data obtained during the current operation of the electronic apparatus 100. Therefore, the processor 180 can identify the possibility of occurrence of the state error of at least one component, i.e. the first component based on the obtained state data and the error data including the previously learned model. Details will be described later with reference to FIG. 5.

According to an embodiment of the disclosure, the processor 180 performs an error-related operation for the second component correlating with the state error of the first component, of which possibility of identified (S340).

The processor 180 can identify the possibility of occurrence of the state error of the first component based on the operation of the second component currently measured using the error data and the state data corresponding to the operation. Therefore, the processor 180 may, for example, set parameters for the second component to lower the possibility of occurrence of the state error, thereby performing the error-related operations. Details will be described later with reference to FIGS. 5 and 6.

According to an embodiment of the disclosure, the electronic apparatus 100 monitors the state error, which is likely to occur, based on the periodically obtained state data in real time, and performs necessary error-related operations, thereby autonomously keeping the optimum state of the electronic apparatus 100.

Figure 4:
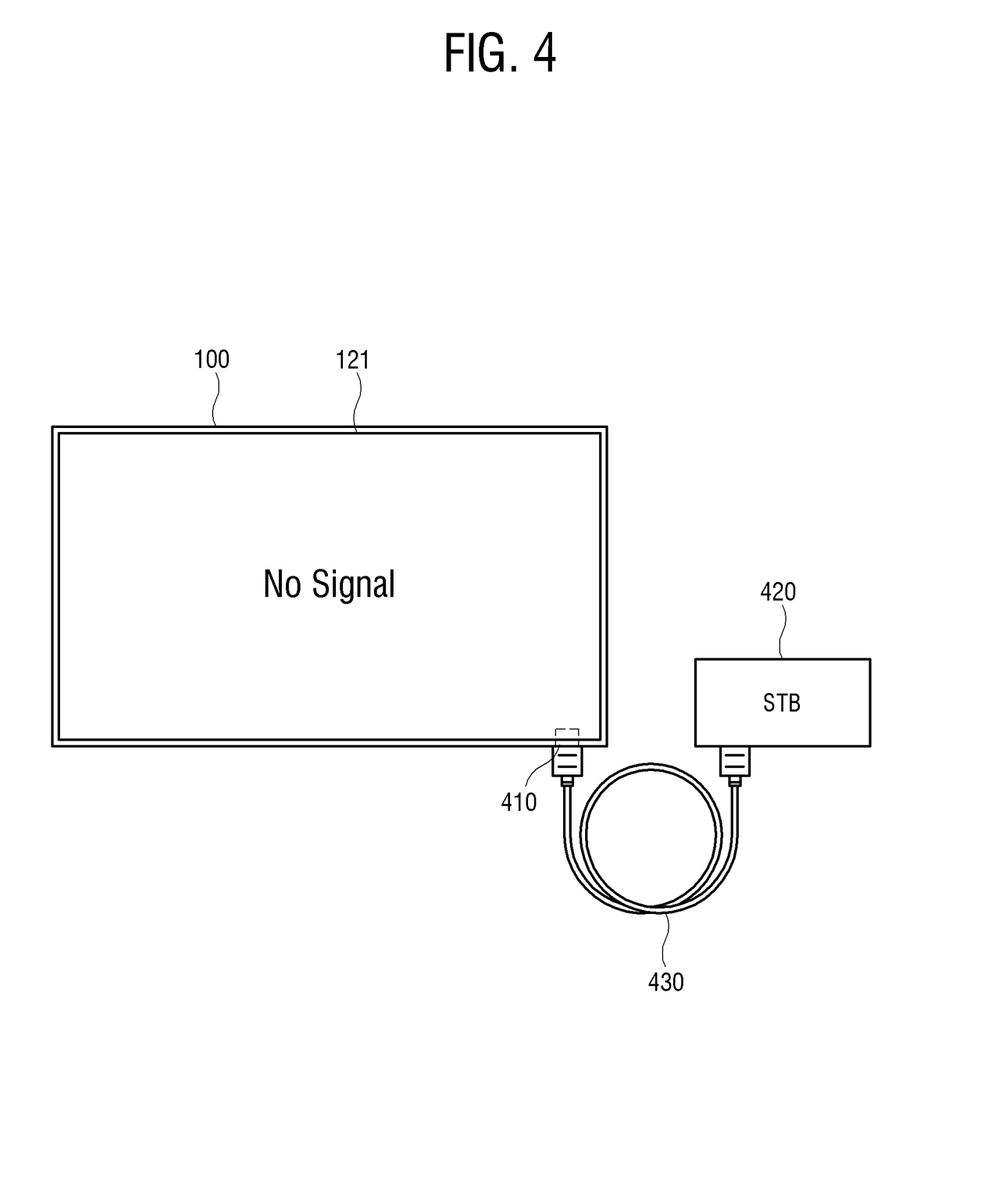
FIG. 4 illustrates an operation of an electronic apparatus according to an embodiment of the disclosure.

FIG. 4 illustrates an operation of an electronic apparatus according to an embodiment of the disclosure. Referring to FIG. 4, the electronic apparatus 100 is connected to a set-top box 420 through an HDMI port 410. In FIG. 4, the HDMI port 410 is built in the electronic apparatus 100 and exaggerated for convenience of description, in which there are no limitations to the shape and the position.

As described in the processes S310 and S320 of the FIG. 3, the processor 180 obtains the state data about the operations of the plurality of components, and identifies the state error of the first component.

For example, it will be assumed that the first component 10 is a display 121 of the electronic apparatus 100 shown in FIG. 4. The processor 180 may identify that the output signal of the first component 10 among the plurality of components, i.e. the display 121 is not detected, based on the foregoing state data about the plurality of components.

The processor 180 can identify that the state error of the first component 10 may, for example, occur in relation to the HDMI port 410 corresponding to the second component 20 among the plurality of components, based on the error data described in the process S330 of FIG. 3. In more detail, the processor 180 can identify that the occurrence of the state error of the first component 10 is caused by the change in the state data according to the operation of the second component 20, based on the error data including the models or the like generated by the known algorithm or the machine learning. Therefore, the processor 180 may identify an error that the output signal from the display 121 is not detected, when the state data is changed according to the operation of the HDMI port 410, based on the error data.

In relation to this drawing, the processor 180 may obtain data about a detected voltage level of a hot plug detect (HPD) pin in the HDMI port 410 as the state data corresponding to the operation of the HDMI port 410.

The HPD refers to a circuit or system that detects a signal input/output when the set-top box 420 connected to the electronic apparatus 100 is powered on. In other words, first, when voltage is output from the set-top box 420 to the HDMI port 410 of the electronic apparatus 100 through a cable 430, the HDMI port 410 intactly feeds the output voltage back to the set-top box 420 through the HPD line. When the feedback voltage is normal, the set-top box 420 identifies that the connection is normal, and outputs an image signal to the electronic apparatus 100.

According to an embodiment, the error data includes data of an HPD pin voltage of the HDMI port 410, collected under various operation situations of the electronic apparatus 100. Further, the error data includes data about what level of the HPD pin voltage of the HDMI port 410 causes the state error to occur in the output signal of the display 121. The electronic apparatus 100 may generate the error data, from which a result of a correlation between the state error that occurs in the output signal of the display 121 and the HPD pin voltage of the HDMI port 410 is obtainable, based on the known algorithm, or the error data based on a method of using a model learned to identify the correlation between the state error and the HPD pin voltage through the machine learning or the like.

The processor 180 can identify whether the state error is likely to occur in the output signal of the display 121, through the current HPD pin voltage of the HDMI port 410 based on the generated error data. For example, when it is identified based on the error data that the state error occurs in the output signal of the display 121 under the condition that the HPD pin voltage of the HDMI port 410 has a level of '100', the processor 180 may identify that the state error is likely to occur in the output signal of the display 121 when the current HPD pin voltage of the HDMI port 410 has a level of about '90'. Of course, such a level is merely an example, and the threshold of the HPD pin voltage of the HDMI port 410, at which the state error is likely to occur in the output signal of the display 121, may be set by various methods.

When it is identified based on the HPD pin voltage of the HDMI port 410 or the like that the state error is likely to occur in the output signal of the display 121, the processor 180 may perform an error-related operation for the HDMI port 410 correlating with the state error of the display 121. The processor 180 may display a graphic user interface (GUI), which shows the state error of the display 121, on the display 121. For example, as shown in FIG. 4, "No Signal" may be displayed as a meaning that the output signal is not input to the display 121.

When it is identified that the HDMI port 410 has no problems, the processor 180 identifies the cause of the state error through the state data about the operation of another component, i.e. the second component, which may affect the state error of the first component, and performs an error-related operation.

The processor 180 may periodically collect the state data about the operation of the second component related to the output of the display 121 or the HPD pin of the HDMI port 410 as well as the case where the state error has already occurred in the display 121, thereby identifying the possibility of occurrence of the state error before the state error occurs in the display 121.

According to an embodiment of the disclosure, the electronic apparatus 100 not only identifies the cause of the state error based on the error data and performs an operation to solve this error when the state error occurs, but also beforehand identifies the possibility of occurrence of the state error to thereby prevent the state error.

Figure 5:
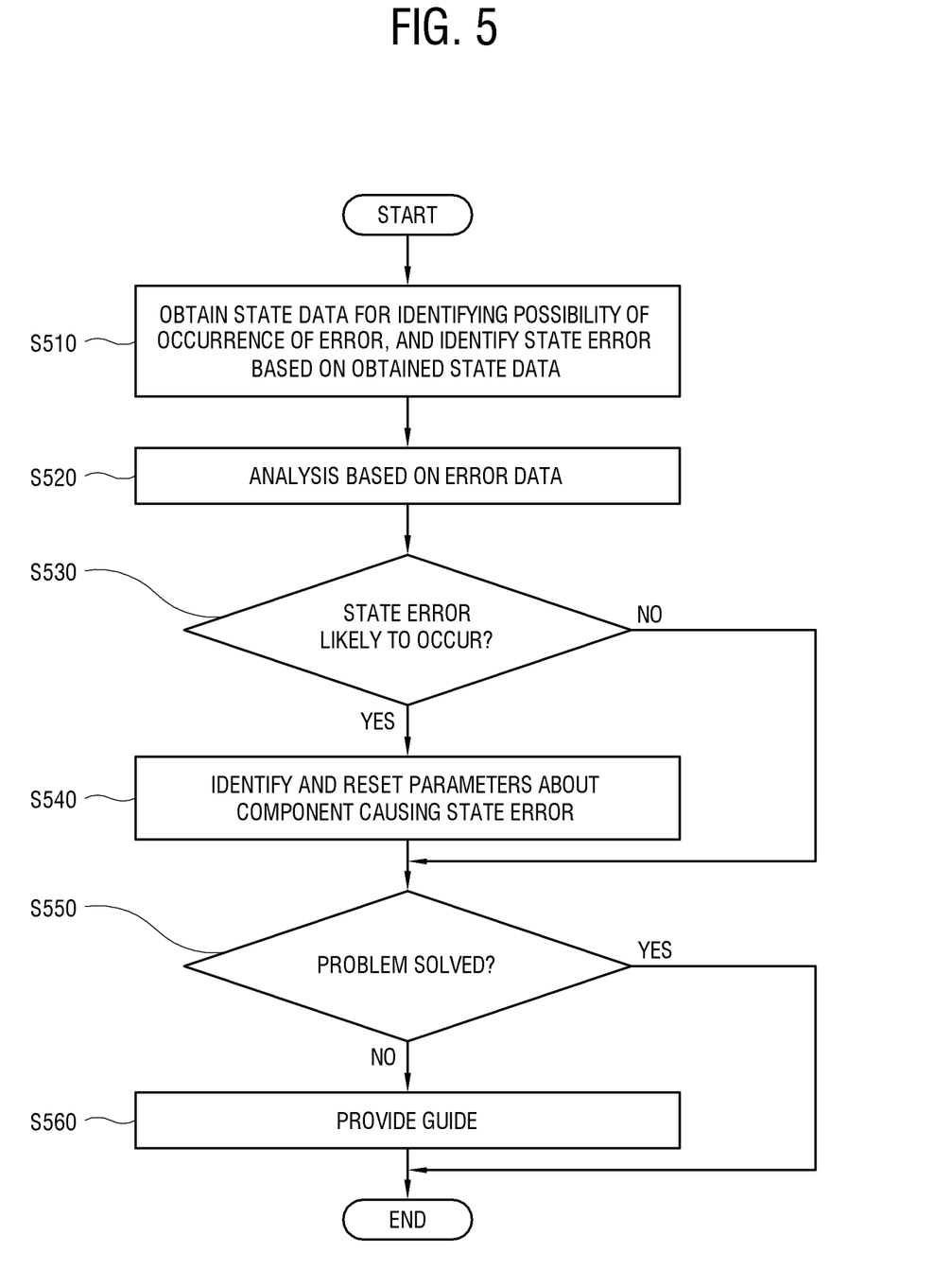
FIG. 5 is an operation flowchart of an electronic apparatus according to an embodiment of the disclosure.

FIG. 5 is an operation flowchart of an electronic apparatus according to an embodiment of the disclosure.

FIG. 5 is a flowchart showing more detailed operation processes of the electronic apparatus 100 described in FIG. 3, in particular, focusing on the process S340 of FIG. 3.

The processor 180 obtains the state data for identifying the possibility of occurrence of the error, and identifies the state error based on the obtained state data (S510). The processor 180 analyzes the obtained state data based on the error data (S520).

The processor 180 identifies whether the state error is likely to occur, based on an analysis result (S530). When it is identified that the state error is unlikely to occur (NO in S530), the processor 180 terminates the operation but periodically diagnoses the possibility of occurrence of the state error.

On the other hand, when it is identified that the state error is likely to occur (YES in S530), the processor 180 identifies and resets the parameters of the component causing the state error (S540).

According to an embodiment of the disclosure, the parameters may be factors by which the states of the components are adjustable, and, for example, correspond to a timing margin of the DDR memory (or the second component) correlating with the temperature of the power circuit (or the first component) or the PLL voltage of the processor (or the second component) when the temperature of the power circuit (or the first component) kept at 30~40° C. is suddenly increased to be higher than or equal to 60° C.

The processor 180 may perform the error-related operation by setting the identified parameters about the second component to lower the possibility of occurrence of the state error. In this embodiment, the processor 180 may diagnose the timing margin to block a timing risk, and secure the margin by adjusting an intermediate value when an effective margin is insufficient or biased toward a certain side because of temperature features. Further, the processor 180 may autonomously check whether the margin is actually secured based on the adjustment of the parameter.

Further, the processor 180 may optimize the electronic apparatus 100 so as to lower the PLL voltage of the processor and decrease the temperature.

Another example related to the parameters will be described with reference to FIG. 6.

The processor 180 identifies whether the problem is solved or not (S550), and terminates the operation (YES in S550) when the problem is solved. When the problem is not solved (NO in S550) even through the foregoing error-related operations are performed, the processor 180 informs a user that the problem is not solved (S560). More detailed descriptions will be made with reference to FIG. 7.

According to an embodiment of the disclosure, the electronic apparatus 100 identifies the possibility of occurrence of the state error based on the error data, and performs operations of setting and tuning the parameters of the component causing the state error, thereby keeping the optimal states with respect to a quality level, a change with passage of time, etc. and thus preventing an error.

Figure 6:
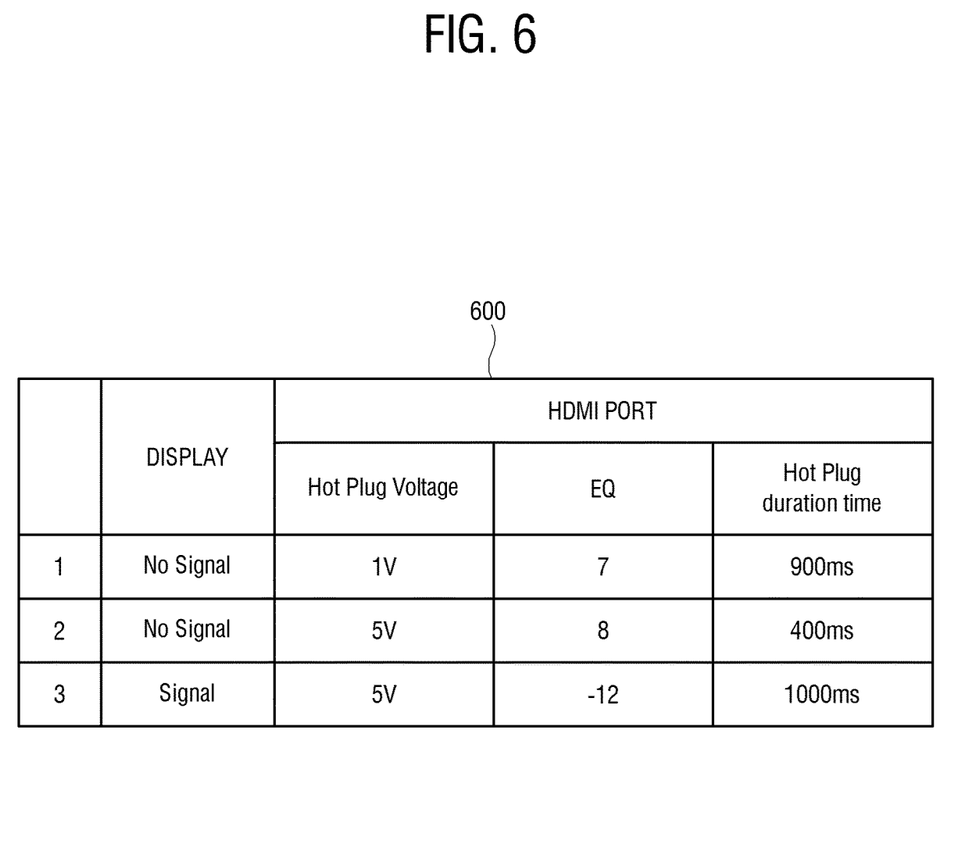
FIG. 6 illustrates use of error data according to an embodiment of the disclosure.

FIG. 6 illustrates use of error data according to an embodiment of the disclosure.

The embodiment shown in FIG. 6 describes another example of performing the error-related operations described with reference to the process S540 of FIG. 5, in case of the correlation between the HDMI port 410 and the display 121 described with reference to FIG. 4.

A table 600 shown in FIG. 6 may be used to predict state errors based on state data of the display 121 and the HDMI port 410 and the possibility of occurrence of the state error.

As described above with reference to FIG. 4, the state error of the display 121 may be caused by the operation of the HDMI port 410.

The processor 180 may identify and reset the parameters of the HDMI port 410 causing the state error of the display 121. As shown in FIG. 6, the processor 180 according to an embodiment of the disclosure identifies a hot plug voltage, an equalizer value (EQ), and hot plug duration time as the parameters of the HDMI port 410.

The processor 180 obtains the state data about the parameters of the HDMI port 410 under different situations, and identifies the state error of the display 121 or the possibility of occurrence of the state error based on change in the parameters of the HDMI port 410. However, in this case, the processor 180 obtains the state data of all the plurality of components rather than only the state data related to the display 121 and the HDMI port 410.

Referring to the table 600 shown in FIG. 6, under the first situation, the HDMI port 410 has a hot plug voltage of '1V', an equalizer value of '7', and a hot plug duration time of '900 ms'.

The processor 180 identifies that no signals are received from the set-top box 420 due to the low hot plug voltage based on the error data, and performs adjustment of identifying and optimizing the settings for the parameter to compensate for the signal strength of the set-top box 420 or lowering the resolution to receive a signal.

Under the second situation in the table 600, the HDMI port 410 has a hot plug voltage of '5V', an equalizer value of '8', and a hot plug duration time of '400 ms'. In this case, it will be assumed that the normal hot plug duration time of the electronic apparatus 100 according to an embodiment of the disclosure ranges from '800 ms' to '1000 ms'.

When the output signal to the display 121 is not detected even at a normal hot plug voltage of '5V', the processor 180 identifies that there is a problem with the hot plug duration time based on the error data, and adjusts the hot plug duration time within the range from '800 ms' to '1000 ms'.

Under the third situation in the table 600, the HDMI port 410 has a hot plug voltage of '5V', an equalizer value of '-12', and a hot plug duration time of '1000 ms'. In this case, it will be assumed that the normal equalizer value of the electronic apparatus 100 according to an embodiment of the disclosure ranges from '6' to '10'.

The processor 180 obtains the state data about the plurality of components, analyzes the obtained state data, and identifies that the HDMI port 410 has an equalizer value of '-12'. The processor 180 identifies that the equalizer value is beyond the normal range based on the error data. When this equalizer value is continued, the processor 180 may identify that the state error is likely to occur in the display 121. In this case, the processor 180 adjusts the equalizer value within the range from '6' to '10'.

Meanwhile, when it is identified based on the error data that the state error of the display 121 is likely to occur even though the processor 180 adjusts the equalizer value within the normal range (because the display 121 could operate due to the abnormal equalizer value), the processor 180 identifies a problem with the cable 430 based on the error data and performs the error-related operation.

According to an embodiment of the disclosure, it is more convenient for a user because the processor finds out the correlation between the plurality of components based on the error data including the model learned based on the AI technology and solves the state error by autonomous identification. Further, massive state data is collected and a correlation algorithm is used to learn the error data, thereby reducing service costs and removing efficiency through proper handling.

Figure 7:
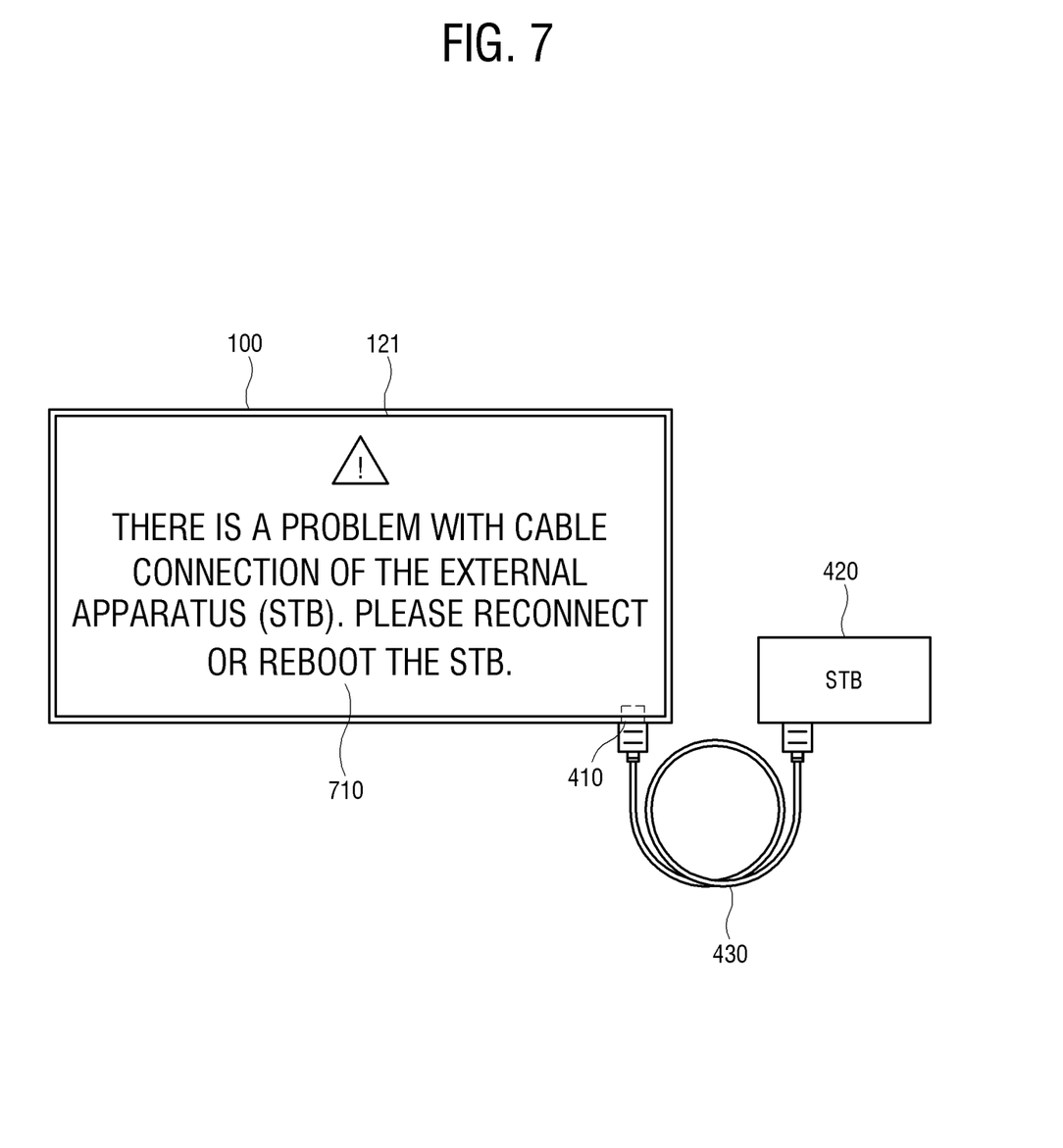
FIG. 7 illustrates an operation of an electronic apparatus according to an embodiment of the disclosure.

FIG. 7 illustrates an operation of an electronic apparatus according to an embodiment of the disclosure.

FIG. 7 shows an example that the state error is not solved even though the processor 180 autonomously performs the error-related operation to solve the state error with regard to the process S560 of FIG. 5.

When the possibility of occurrence of the state error is not lowered by changing the settings for the parameters, the processor 180 displays a GUI, which shows the state error of the first component and the parameters of the second component corresponding to the state error, on the display 121.

It will be assumed that the state error of the display 121 is not solved or the possibility of occurrence of the state error is not lowered even though the foregoing processor 180 of FIG. 6 performs adjustment for signal compensation, the equalizer, the hot plug duration time, etc.

In this case, the problem may be solved by turning the set-top box 420 off and then on again, or reconnecting the cable. However, such solution is not performable by the electronic apparatus 100 itself, and therefore the processor 180 may display a GUI, which guides a user to do the solution, on the display 121. Thus, the processor 180 in FIG. 7 displays a GUI 710 of "There is a problem with cable connection of the external apparatus (STB). Please reconnect the cable or reboot the STB" on the display 121.

Besides, the processor may perform the error-related operation for the second component based on a user input received through the GUI.

For example, the processor 180 may receive a user's input of adjusting the hot plug duration time, and the like parameters through the user input unit 130 such as a remote controller, a touch screen, etc. and performs the error-related operation based on the received user's input.

Further, when the problem is not solved by a user's input, for example, when a consumable part is required to be replaced, the processor 180 may display a GUI of guiding required points for a service on the display 121.

When this method is not enough to solve the problem, the processor 180 transmits relevant information to a service center through the interface unit 110, and guides a user to get a proper handling service.

According to an embodiment of the disclosure, convenience for a user is increased and service satisfaction becomes higher because the user is guided to easily solve a hardware problem.

According to an embodiment of the disclosure, a service is not varied depending on individual capabilities, but leveled up in quality.

According to an embodiment of the disclosure, possibility of occurrence of an state error is monitored based on AI in real time, and an electronic apparatus autonomously keeps an optimum operation state, thereby preventing the error.

While the embodiments of the disclosure have been described in detail, it will be understood by one of ordinary skill in the art that various changes in form and details may be made therein without departing from the spirit and scope of the disclosure as defined by the following claims.

What is claimed is:

1. An electronic apparatus comprising:
a processor; and
a memory configured to store instructions executable by the processor,
wherein the processor is configured to:
obtain state data about operations of a plurality of components in the electronic apparatus;
based on error data about a correlation between the plurality of components with respect to the obtained state data, identify a second component corresponding to a first component having possibility of occurrence of a state error; and
perform an error-related operation for the second component by changing setting for parameters about the second component to lower the possibility of occurrence of the state error of the first component.

2. The electronic apparatus according to claim 1, wherein the error data comprises a model learned to perform calculation for the correlation between the plurality of components.

3. The electronic apparatus according to claim 1, wherein the processor is configured to display a graphic user interface (GUI), which shows the state error of the first component and the parameters about the second component corresponding to the state error, on a display.

4. The electronic apparatus according to claim 3, wherein the processor is configured to perform the error-related operation for the second component based on a user's input received through the GUI.

5. The electronic apparatus according to claim 1, wherein the processor is configured to:
display a GUI, which shows the state error of the first component and the parameters about the second component corresponding to the state error, on a display, based on the possibility of occurrence of the state error not lowered by changing the setting for the parameters; and
perform the error-related operation for the second component based on a user's input received through the GUI.

6. The electronic apparatus according to claim 1, wherein the processor is configured to periodically identify the possibility of occurrence of the state error of the first component.

7. The electronic apparatus according to claim 1, wherein the processor is configured to identify the state error of the first component based on state data of an operation of the first component and state data of an operation of the second component.

8. The electronic apparatus according to claim 1, further comprising a display and a high-definition multimedia interface (HDMI) port,
wherein the first component is the display and the second component is the HDMI port.

9. A method of controlling an electronic apparatus, comprising:
obtaining state data about operations of a plurality of components in the electronic apparatus;
based on error data about a correlation between the plurality of components with respect to the obtained state data, identifying a second component corresponding to a first component having possibility of occurrence of a state error; and
performing an error-related operation for the second component by changing setting for parameters about the second component to lower the possibility of occurrence of the state error of the first component.

10. The method according to claim 9, wherein the error data comprises a model learned to perform calculation for the correlation between the plurality of components.

11. The method according to claim 9, further comprising displaying a graphic user interface (GUI), which shows the state error of the first component and the parameters about the second component corresponding to the state error on a display.

12. The method according to claim 11, wherein the performing the error-related operation for the second component comprises performing the error-related operation for the second component based on a user's input received through the GUI.

13. The method according to claim 9, wherein the performing of the error-related operation comprises:
displaying a GUI, which shows the state error of the first component and the parameters about the second component corresponding to the state error, on a display, based on the possibility of occurrence of the state error not lowered by changing the setting for the parameters; and
performing the error-related operation for the second component based on a user's input received through the GUI.

14. The method according to claim 9, further comprising periodically identifying the possibility of occurrence of the state error of the first component.

15. The method according to claim 9, further comprising identifying the possibility of occurrence of the state error of the first component,
wherein the identifying of the state error of the first component comprises identifying the state error based on state data of an operation of the first component and state data of an operation of the second component affecting the state error of the first component.

16. The method according to claim 9, wherein the first component is a display of the electronic apparatus and the second component is a high-definition multimedia interface (HDMI) port of the electronic apparatus.

17. A non-transitory computer-readable recording medium stored with a computer program comprising a code, which performs a method of controlling an electronic apparatus, as a computer-readable code, the method comprising:
obtaining state data about operations of a plurality of components in the electronic apparatus;
based on error data about a correlation between the plurality of components with respect to the obtained state data, identifying a second component corresponding to a first component having possibility of occurrence of a state error; and
performing an error-related operation for the second component by changing setting for parameters about the second component to lower the possibility of occurrence of the state error of the first component.

* * * * *